US010330052B2

(12) United States Patent
Elder et al.

(10) Patent No.: US 10,330,052 B2
(45) Date of Patent: Jun. 25, 2019

(54) LOW NITROGEN OXIDE EMISSION WATER HEATER

(71) Applicant: Rheem Manufacturing Company, Atlanta, GA (US)

(72) Inventors: Gary A. Elder, Montgomery, AL (US); Tanjir Ratul, Montgomery, AL (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 0 days.

(21) Appl. No.: 15/638,264

(22) Filed: Jun. 29, 2017

(65) Prior Publication Data
US 2019/0003426 A1   Jan. 3, 2019

(51) Int. Cl.
| *F02M 25/12* | (2006.01) |
| *F02B 47/02* | (2006.01) |
| *F02C 7/224* | (2006.01) |
| *F02M 53/02* | (2006.01) |
| *F23L 7/00* | (2006.01) |
| *F02M 33/00* | (2006.01) |

(52) U.S. Cl.
CPC ............ *F02M 25/12* (2013.01); *F02B 47/02* (2013.01); *F02C 7/224* (2013.01); *F02M 53/02* (2013.01); *F23L 7/002* (2013.01); *F02M 33/00* (2013.01); *F23L 7/00* (2013.01)

(58) Field of Classification Search
CPC ....... F24H 1/205; F24H 9/1836; F02M 25/12; F02M 53/02; F02M 33/00; F23L 7/002; F23L 7/00; F02C 7/224; F02B 47/02
See application file for complete search history.

(56) References Cited

U.S. PATENT DOCUMENTS

| 4,165,963 | A | | 8/1979 | Nozaki | |
| 4,549,525 | A | * | 10/1985 | Narang | F24H 9/2035 |
| | | | | | 122/14.21 |
| 5,355,841 | A | * | 10/1994 | Moore, Jr. | F23D 14/145 |
| | | | | | 122/18.31 |
| 5,511,516 | A | * | 4/1996 | Moore, Jr. | F23D 14/14 |
| | | | | | 122/18.31 |
| 5,697,330 | A | * | 12/1997 | Yetman | F24H 1/205 |
| | | | | | 122/14.21 |
| 5,875,739 | A | * | 3/1999 | Joyce | F23C 5/00 |
| | | | | | 122/18.31 |
| 6,725,811 | B1 | * | 4/2004 | Moore, Jr. | F23D 14/14 |
| | | | | | 122/13.01 |
| 6,994,056 | B1 | | 2/2006 | Boros | |
| 7,040,258 | B2 | * | 5/2006 | Peart | F23M 9/02 |
| | | | | | 122/13.01 |
| 7,607,408 | B2 | | 10/2009 | Peart | |
| 7,665,426 | B2 | | 2/2010 | O'Donnell et al. | |
| 7,857,617 | B2 | | 12/2010 | O'Donnell et al. | |

(Continued)

FOREIGN PATENT DOCUMENTS

JP          S57164213 A          10/1982

*Primary Examiner* — Steven B McAllister
*Assistant Examiner* — Steven S Anderson, II
(74) *Attorney, Agent, or Firm* — King & Spalding LLP

(57) ABSTRACT

A water heater has a gas burner in a combustion chamber below a tank. The burner has a venturi tube oriented in a collection housing, which receives a mixture of air and fuel from a duct at least partially protruding from a periphery of an exterior wall of the water heater. In some embodiments, the duct abuts the venturi tube within a collection housing in the combustion chamber.

14 Claims, 15 Drawing Sheets

(56) References Cited

U.S. PATENT DOCUMENTS

| | | | |
|---|---|---|---|
| 8,292,616 B2 | 10/2012 | O'Donnell et al. | |
| 8,333,584 B2 | 12/2012 | Cook | |
| 2001/0010209 A1* | 8/2001 | Bourke | F23D 14/72 |
| | | | 122/14.31 |
| 2002/0134320 A1* | 9/2002 | Valcic | F23D 14/72 |
| | | | 122/14.31 |
| 2005/0172915 A1* | 8/2005 | O'Donnell | F23C 5/02 |
| | | | 122/17.1 |
| 2006/0150925 A1* | 7/2006 | Akkala | F24H 1/205 |
| | | | 122/14.1 |
| 2008/0264356 A1* | 10/2008 | Oda | F24H 1/205 |
| | | | 122/18.3 |
| 2008/0268393 A1* | 10/2008 | Oda | F23D 14/065 |
| | | | 431/354 |
| 2008/0268394 A1* | 10/2008 | Oda | F23D 14/065 |
| | | | 431/354 |

\* cited by examiner

LOW NITROGEN OXIDE EMISSION WATER HEATER

FIELD OF THE INVENTION

The present invention relates generally to gas powered water heaters.

BACKGROUND OF THE INVENTION

Gas powered water heaters are used to heat and store a quantity of water in a storage tank for subsequent on-demand delivery to plumbing fixtures such as sinks, bathtubs, showers, and appliances in residential and commercial buildings. Gas water heaters typically utilize a combustible gas source coupled to an air source for providing oxygen necessary for combustion. The gas and air are typically combusted in a combustion chamber at a burner beneath a water storage tank.

When a combustion area proximate the burner rises to a sufficient temperature, nitrogen present in the combustion area becomes reactive with uncombusted oxygen in the combustion chamber, thereby producing nitrogen oxides (NO and $NO_2$, or collectively, $NO_x$), the emission levels of which can be subject to environmental controls.

The accompanying drawings, which are incorporated in and constitute a part of this specification, illustrate one or more embodiments of the invention and, together with the description, serve to explain the principles of the invention.

SUMMARY OF THE INVENTION

The present invention recognizes and addresses considerations of prior art constructions and methods.

One or more embodiments of the present disclosure relate to a water heater having a tank defining a first volume for holding water and having a lower wall beneath the first volume, wherein the lower tank wall defines a first surface opposite the first volume. A side wall extends below the lower tank wall about a periphery of the tank, thereby defining a second surface. A bottom wall adjoins the side wall opposite the lower tank wall, thereby defining a third surface, so that the first surface, the second surface, and the third surface define a second volume. The water heater further has a duct in communication with an air source external to the second volume so that a third volume at least partially bounded by the duct receives air from the air source. The duct is in fluid communication with a pressurized fuel gas source so that the third volume receives a flow of fuel gas from the pressurized fuel gas source and so that the air and fuel gas flow out of the third volume at least partially bounded by the duct in an output flow. At least a portion of the volume at least partially bounded by the duct is disposed outward of the second volume and the periphery. A burner assembly is partially disposed within the second volume. The burner has a collection housing defining an inlet that receives the output flow and that defines an enclosure in fluid communication with the inlet. The enclosure receives the air and the fuel gas from the output flow for mixture in the enclosure. The collection housing bounds the air and fuel gas within the enclosure except for flow thereof from the inlet and through an upper aperture in the collection housing. The burner assembly further comprises a perforated burner surface disposed within the second volume above the upper aperture and opposing the lower tank wall.

In further embodiments, a water heater has a tank defining a first volume for holding water and having a lower wall beneath the first volume, wherein the lower tank wall defines a first surface opposite the first volume. The tank further has a side wall extending below the lower tank wall about a periphery of the tank, thereby defining a second surface. A bottom wall adjoins the side wall opposite the lower tank wall, thereby defining a third surface, so that the first surface, the second surface, and the third surface define a second volume. The tank further has a duct with a protruding outlet in communication with an air source external to the second volume so that a third volume at least partially bounded by the duct receives air from the air source, wherein the duct is in fluid communication with a pressurized fuel gas source so that the third volume receives a flow of fuel gas from the pressurized fuel gas source and so that the air and fuel gas flow out of the third volume at least partially bounded by the duct in an output flow through the protruding outlet. The water heater further has a burner assembly partially disposed within the second volume. The burner has a venturi tube and a collection housing. The collection housing defines an inlet that receives the output flow and defines an enclosure in fluid communication with the inlet so that the enclosure receives the air and the fuel gas from the output flow for mixture in the enclosure. The collection housing bounds the air and fuel gas within the enclosure except for flow thereof from the inlet and through an upper aperture in the collection housing. Further, the venturi tube is disposed within the enclosure, and the protruding outlet is received within the enclosure so that the outlet abuts the venturi tube and is in fluid communication therewith so that the venturi tube receives the output flow therefrom. The burner further has a perforated burner surface disposed within the second volume above the upper aperture and opposing the lower tank wall.

The accompanying drawings, which are incorporated in and constitute a part of this specification, illustrate one or more embodiments of the invention and, together with the description, serve to explain one or more embodiments of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
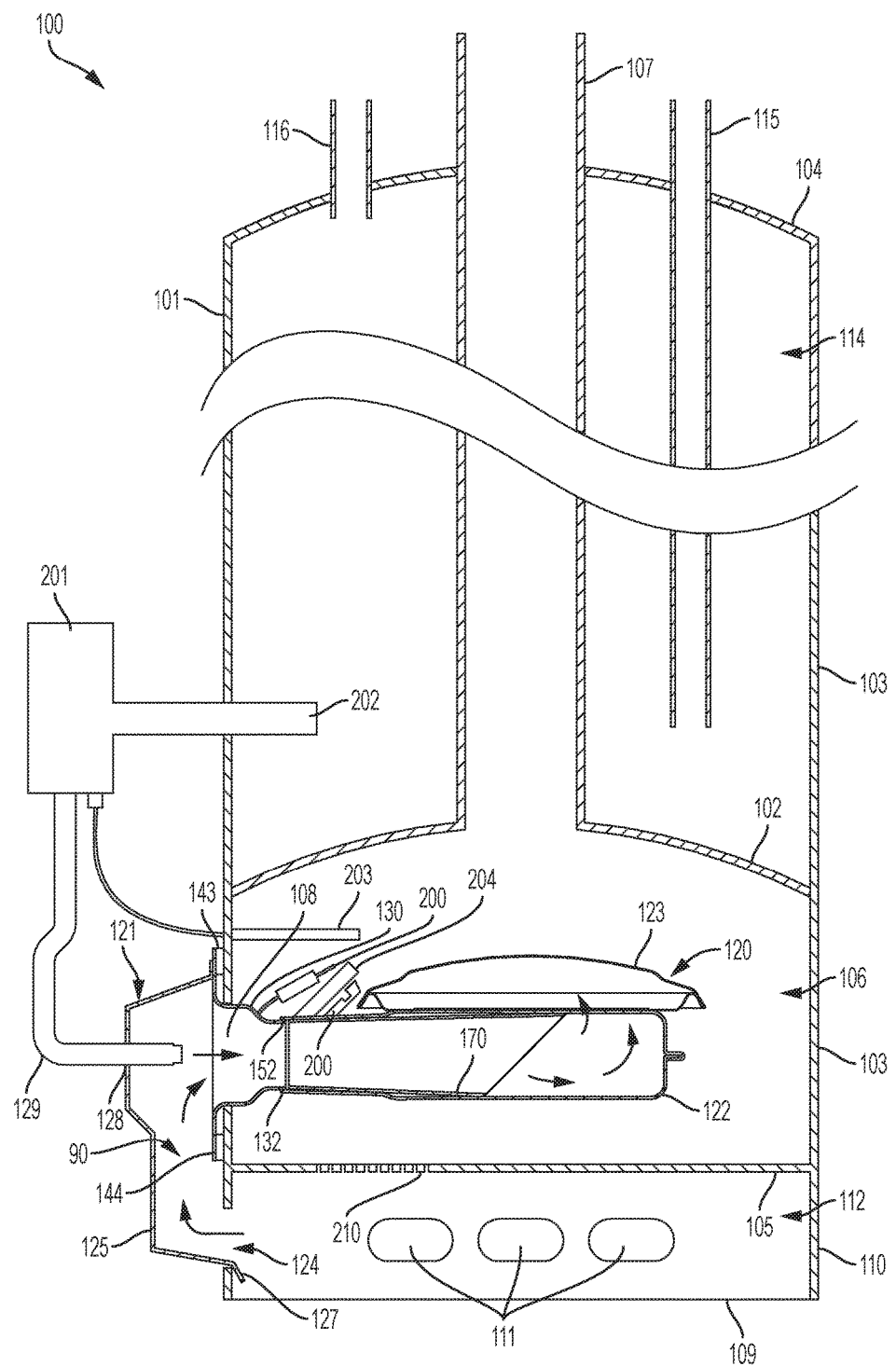
FIG. 1 is a schematic elevation view of a water heater.

Repeat use of reference characters in the present specification and drawings is intended to represent same or analogous features or elements of the invention according to the disclosure.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the water heater, such as but not limited to "vertical," "horizontal," "upper," "lower," "above," or "below," refer to directions and relative positions with respect to the water heater's orientation in its normal intended operation, as indicated in FIG. 1 herein. Thus, for instance, the terms "vertical" and "upper" refer to the vertical direction and relative upper position in the perspectives of FIG. 1 and should be understood in that context, even with respect to a water heater that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Referring now to FIG. 1, a water heater 100 includes a vertically-oriented body comprising a tank 101 for holding water within an interior volume 114 that is bounded by a lower tank wall 102, a generally cylindrical side wall 103 (i.e. generally annular in cross-sections), and a domed top wall 104. A water inlet tube 115 and a water outlet tube 116 are conduits that provide for water entering and exiting tank 101, respectively. In some embodiments, water heater 100 further comprises insulation about or within side wall 103 and top wall 104 to insulate interior volume 114 of tank 101 from heat transfer with the exterior area ambient to water heater 100.

Lower tank wall 102 further attaches to an exhaust flue 107 that runs vertically through the center of tank 101 and exits through top wall 104 to a vent outside of a building or other enclosure in which tank 101 is disposed. Flue 107 provides a surface through which heat is transferred from hot combustion gasses within the flue to water in volume 114.

Side wall 103 extends below lower tank wall 102 and connects to a horizontal bottom wall 105, so that lower tank wall 102, side wall 103, and bottom wall 105 define a combustion chamber 106. A through-hole 108 in side wall 103 provides access to a burner assembly 120 disposed within combustion chamber 106, comprising a collection housing 122, and a perforated burner surface 123. Burner assembly 120 and a venturi tube 170 (discussed below) are shown with exaggerated material thickness in FIG. 1 to differentiate the components and further illustrate relative geometry between the two components.

Side wall 103 further extends below bottom wall 105 about the periphery of the tank to a floor 109 (or other surface upon which water heater 100 sits) to provide a skirt wall 110. An air chamber 112 is defined as a volume bounded by skirt wall 110, bottom wall 105, and floor 109. Skirt wall 110 comprises a plurality of through-holes 111 about the periphery of skirt wall 110 that fluidly communicates volume 112 with the area ambient to water heater 100 so that air may pass into volume 112 from the ambient area. This air within volume 112 may then exit volume 112 through one or more access through-holes 124 (e.g., three holes) that are in fluid communication with the interior volume of a duct 121 to ultimately supply combustion chamber 106. By providing a plurality of holes 111, when water heater 100 is in operation, air chamber 112, and thus combustion chamber 106, has access to air for combustion even if some of the plurality of holes 111 are blocked.

Figure 2A:
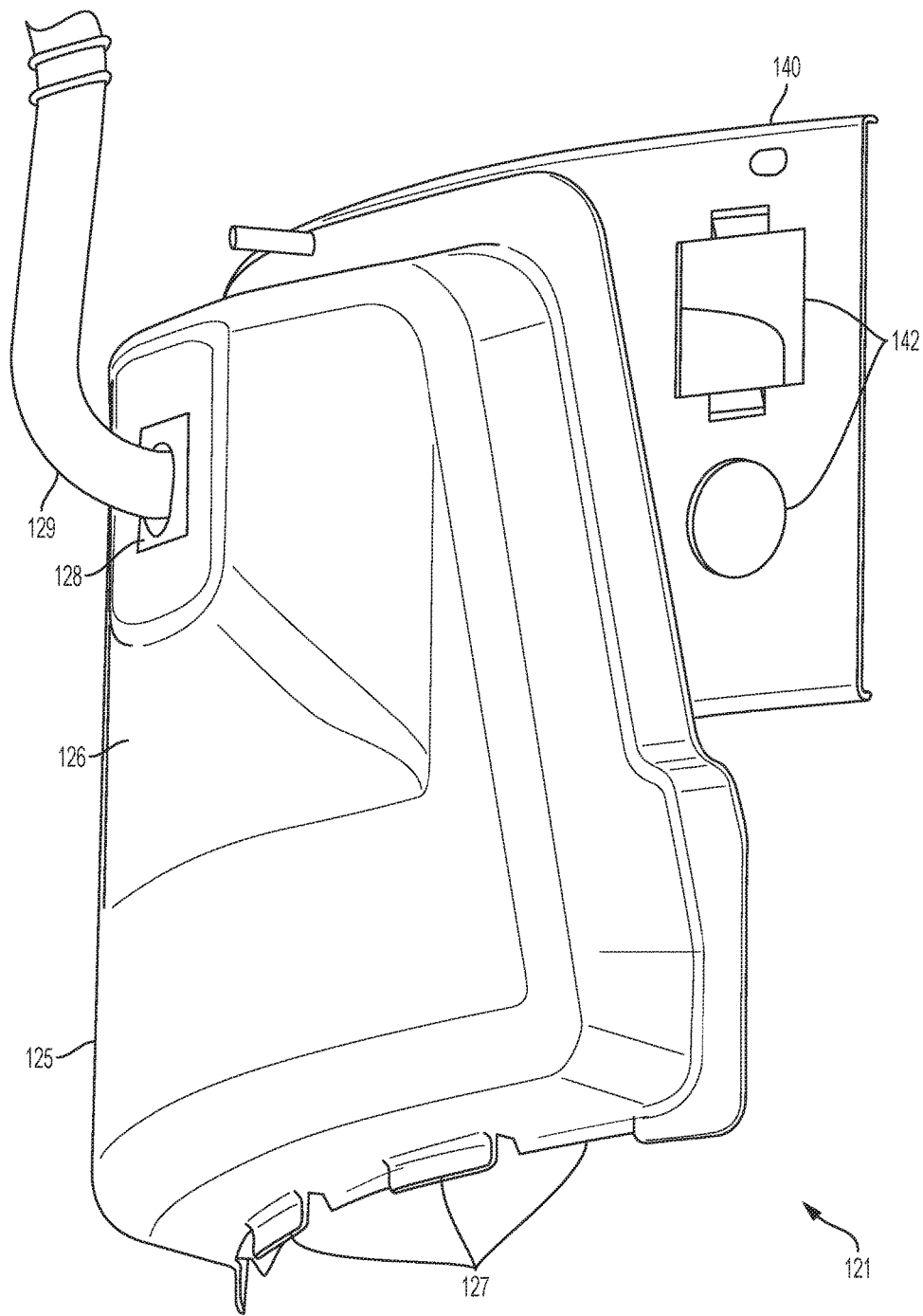
FIG. 2A is a perspective view of a duct of the water heater as in FIG. 1.
Figure 4:
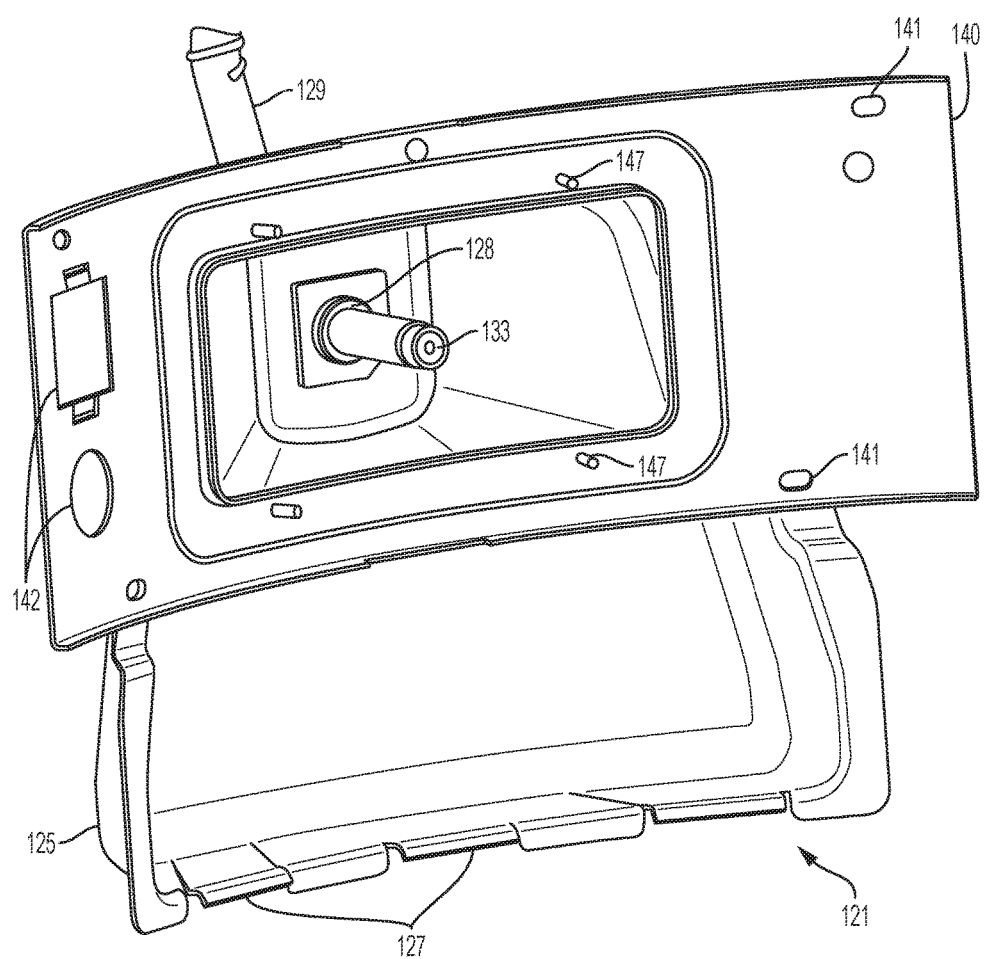
FIG. 4 is a perspective view of the duct as in FIG. 2A.

Also referring to FIG. 2A, duct 121 comprises an exterior duct portion 125 that extends outside the surface of side wall 103 and beyond the periphery of the tank as defined by the periphery of wall 103 and wall 110, and defines a volume 90 exterior of the combustion chamber and outside the periphery of skirt wall 110. Exterior duct portion 125 extends below the intersection of bottom wall 105 and side wall 103 to cover air access through-holes 124 in skirt wall 110, thereby directing air flow from air source chamber 112 into volume 90. Tabs 127 extend from the bottom of exterior duct portion 125 to interlock with the bottom edges of access through-holes 124 defined by skirt wall 110, thereby interlocking duct 121 with skirt wall 110 and resting a portion of duct 121 on lips defined by the bottom edges of access through-holes 124. Exterior duct portion 125 expands into a larger sub-portion 126, having beveled edges, opposite air access through-holes 124. Further, a side of exterior duct portion 125 facing tank wall 103 has a curved profile approximately matching the curve of lower tank wall 103's profile. Exterior duct portion 125 comprises a gas access port 128 at which is attached a gas line 129. As shown in the example embodiment, exterior duct portion 125 extends outward from tank 100 via a lofted protrusion with gas access port 128 being approximately centered within the lofted protrusion. A nozzle 133 (FIG. 4) attaches to gas line 129 within duct 121, which may provide directional flow and affect the pressure/flow dynamics of the gas flow, thereby affecting associated air flow.

Figure 3A:
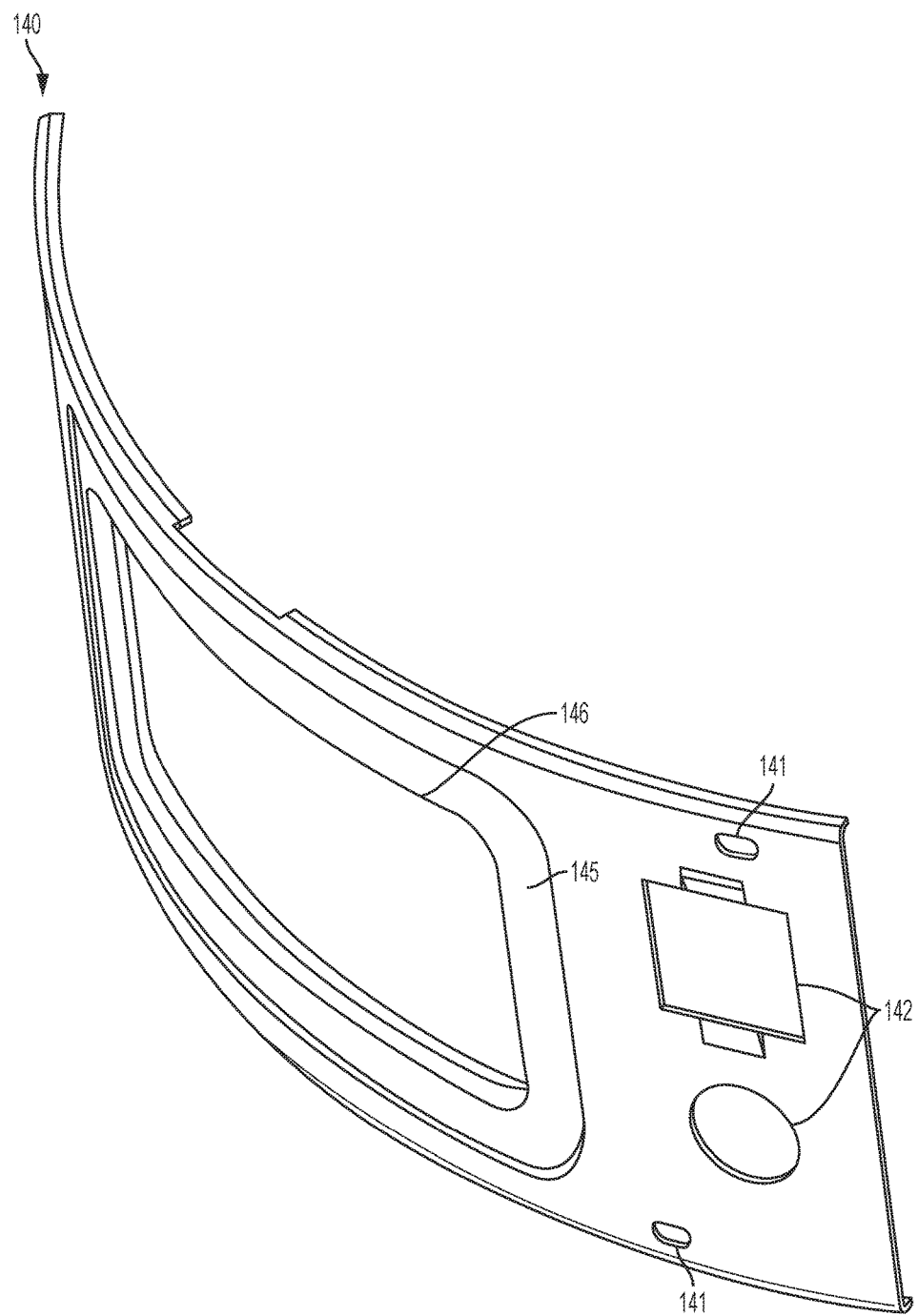
FIG. 3A is a perspective view of a flange for mounting the duct as in FIG. 2A.

Referring to FIGS. 1 and 3A, duct 121 mounts to side wall 103 via an intermediate flange 140, which has a curved surface to mate with and completely surround through-hole 108 in side wall 103. Flange 140 comprises holes 141 to allow for screws or other fasteners to attach duct 121 to wall 103, as well as flange cutouts 142 for providing access to one or more devices (e.g., an igniter, thermistor, flame sensor, etc.) that may be disposed within combustion chamber 106. A thermal gasket 143 (FIG. 5B) is disposed between flange 140 (also shown in FIG. 5B) and side wall 103 (FIG. 1) along the entire circumference of through-hole 108 and serves to seal the interface and thermally insulate combustion chamber 106 (FIG. 1) from the ambient environment. In the illustrated embodiment, thermal gasket 143 comprises one half inch-thick fiberglass and has a rectangular "frame" shape, having a rectangular exterior edge profile and a rectangular through-hole.

Figure 2B:
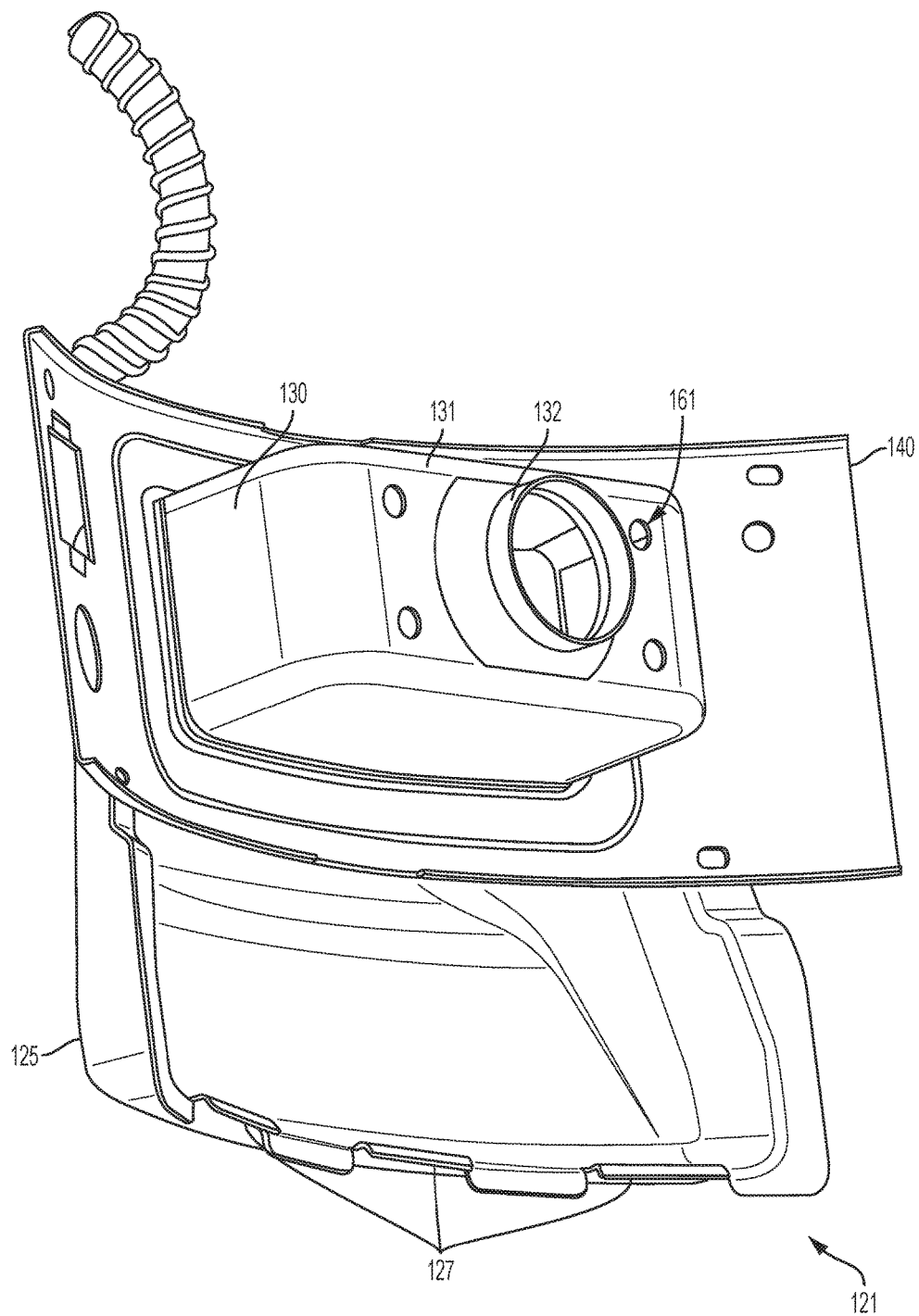
FIG. 2B is another perspective view of the duct as in FIG. 2A.
Figure 3B:
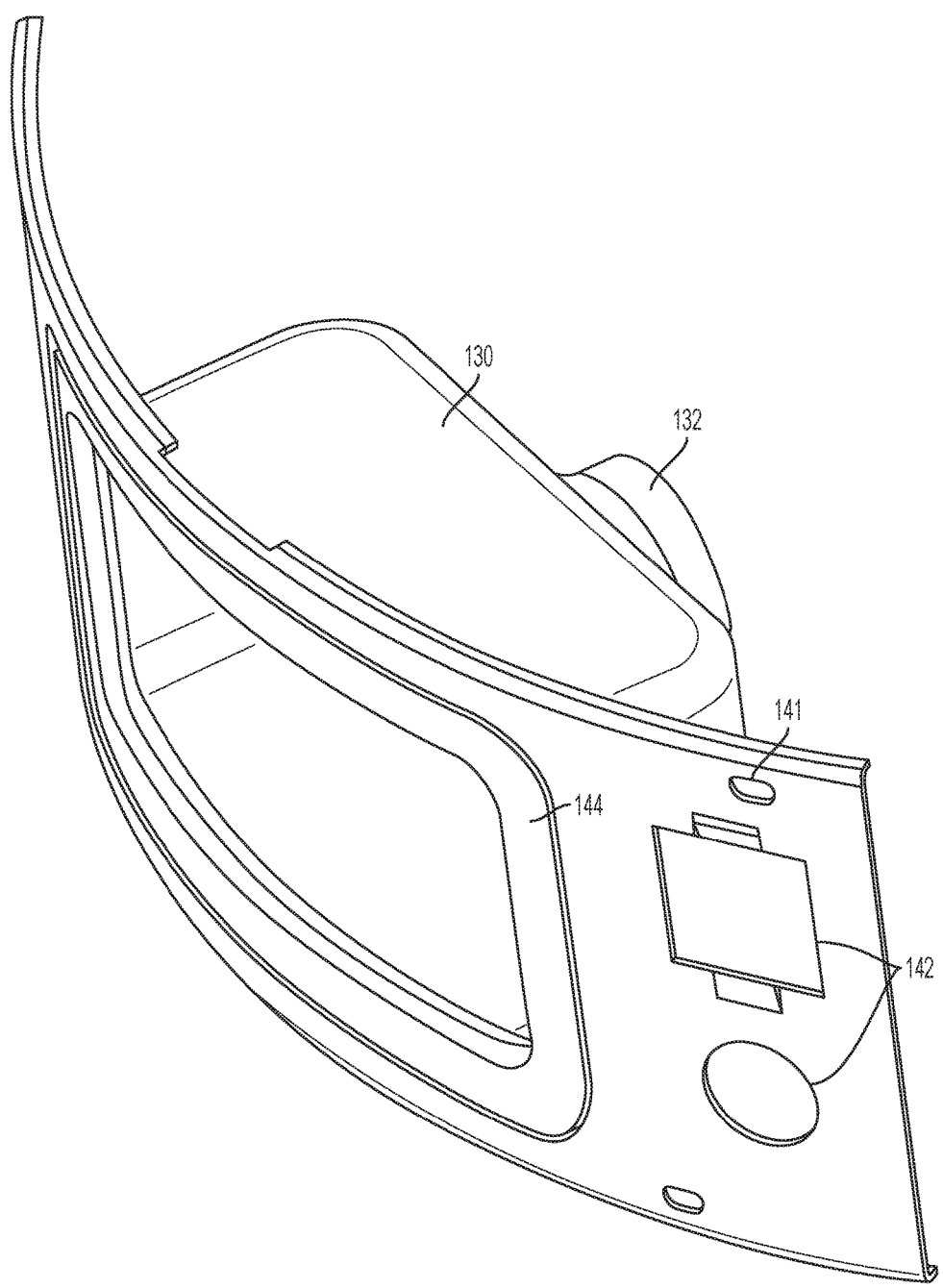
FIG. 3B is a perspective view of the flange and an interior portion of the duct as in FIG. 2A.
Figure 5A:
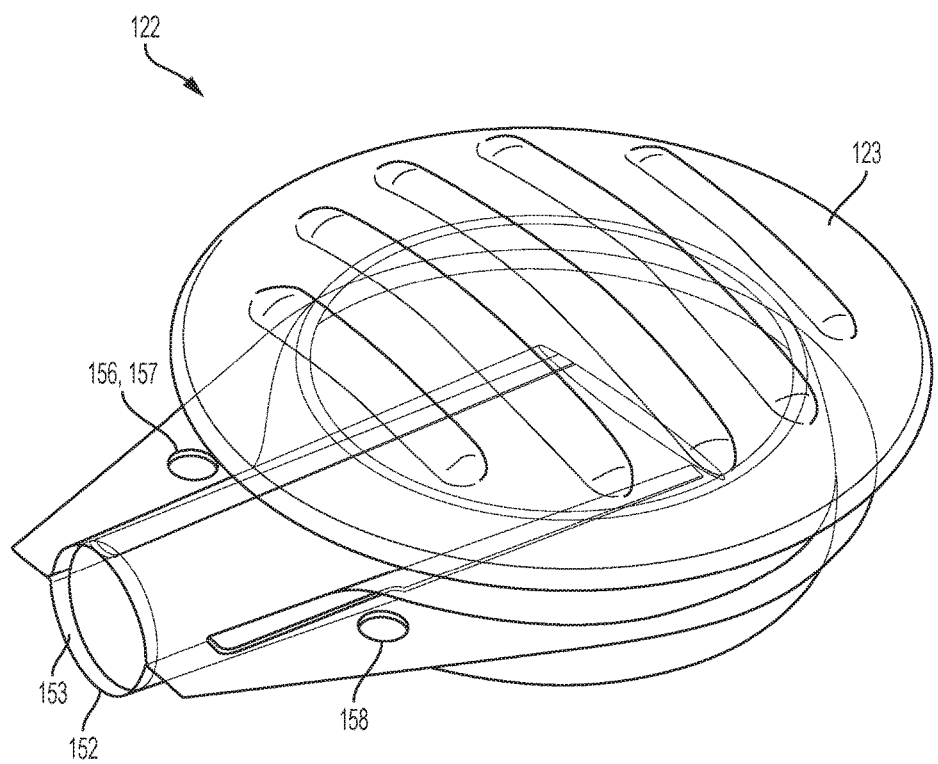
FIG. 5A is a perspective view of a burner of the water heater as in FIG. 1.

Now referring to FIGS. 2B and 3B, duct 121 further comprises an interior duct portion 130, largely having approximately rectangular cross-sections and filleted edges. A front face 131 of interior duct portion 130 tapers into an outlet 132 having approximately circular cross-sections. Outlet 132 mates with an inlet 152 of collection housing 122 (FIG. 5A). In one or more embodiments, duct 121 is made almost entirely of sheet metal, such as cold rolled steel. Interior duct portion 130 is a discrete, unitary part composed of the generally rectangular part 130 and a curved flange 144 matching the curvature of flange 140. In assembly, portion 130 fits through the central aperture of flange 140 until flange 144 abuts the portion of flange 140 about the central aperture 146 (FIG. 3A). Flange 140 has a stepped face 145 (FIG. 3A) to receive curved flange 144, so that an outer face of curved flange 144 is flush with an outer face of flange 140, and defines aperture 146 (FIG. 3A). Stepped face 145 matches the profiles of flange 144 and interior portion 130. Interior duct portion 130 fits into cut-out 146 and affixes to flange 140 via mounting hardware 147 (e.g., rivets).

By disposing the duct partially outside of the combustion chamber, the combustion chamber may house a larger combustion surface than would fit if the duct were fully housed within the combustion chamber.

Figure 5B:
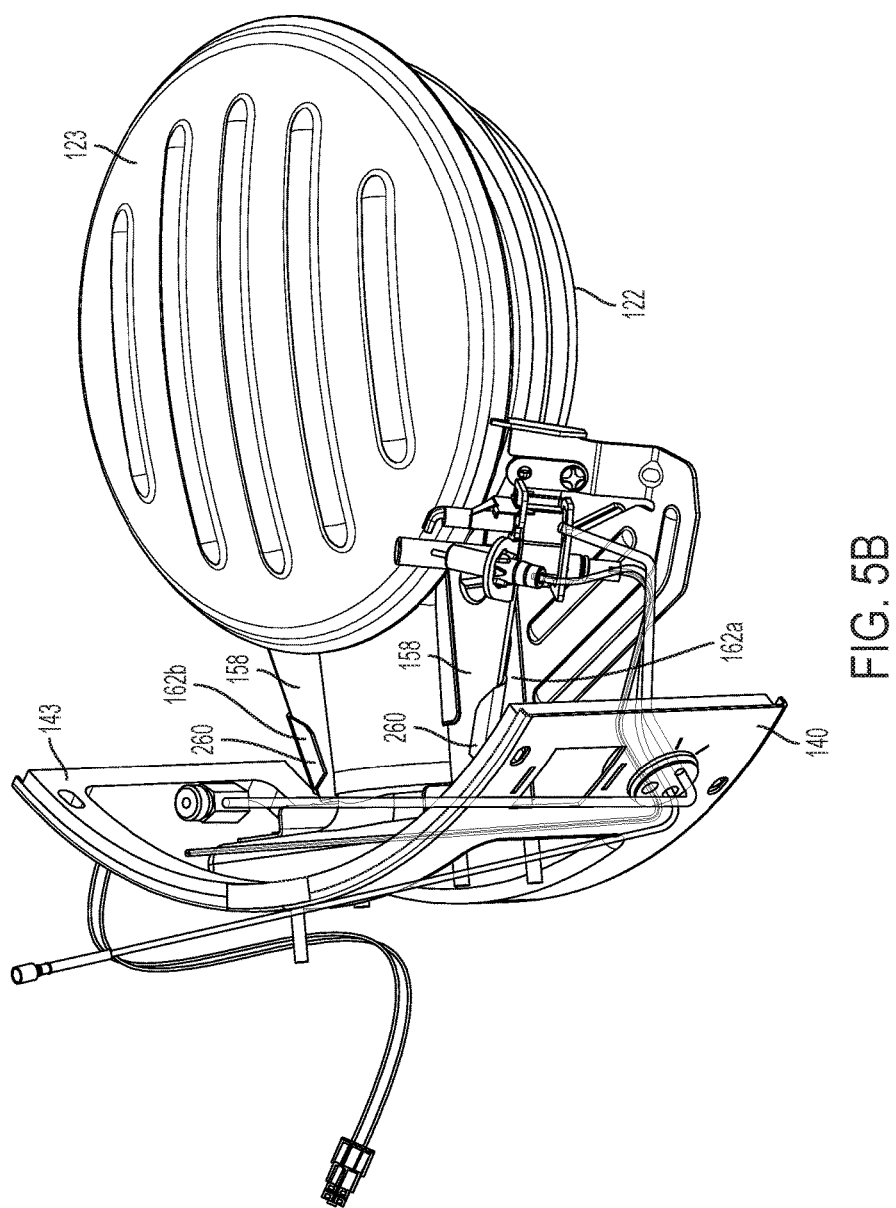
FIG. 5B is a partial perspective view of an interior of a combustion chamber of the water heater as in FIG. 1.
Figure 6:
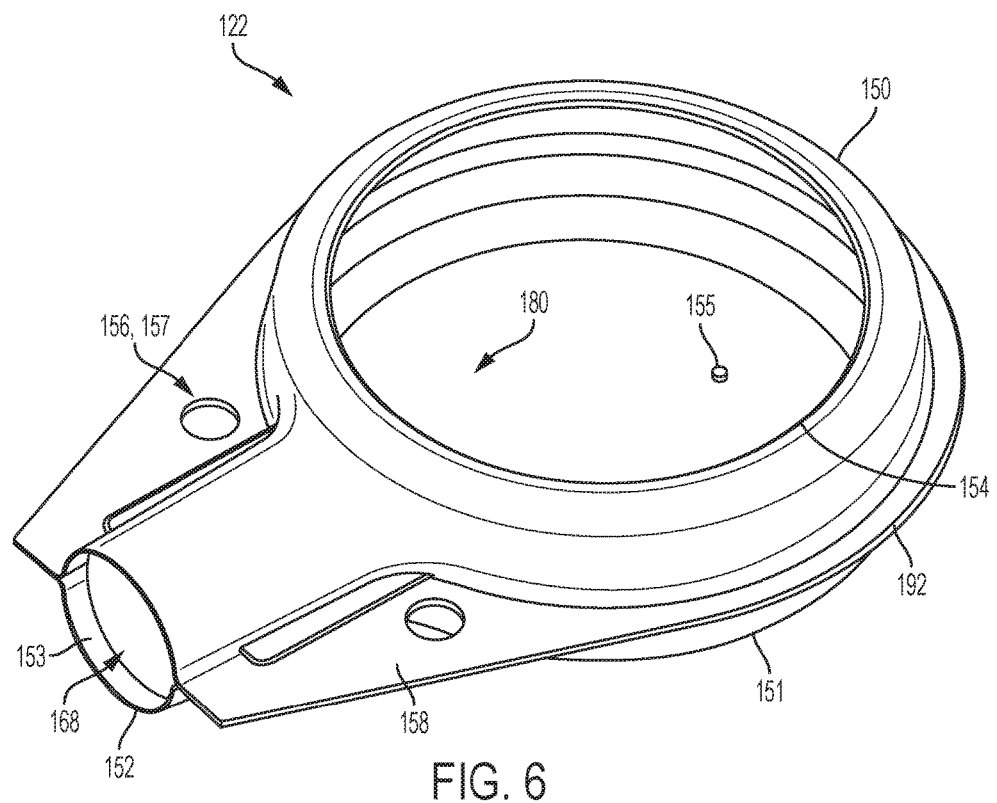
FIG. 6 is a perspective view of a collection housing for the burner of the water heater as in FIG. 1.
Figure 10:
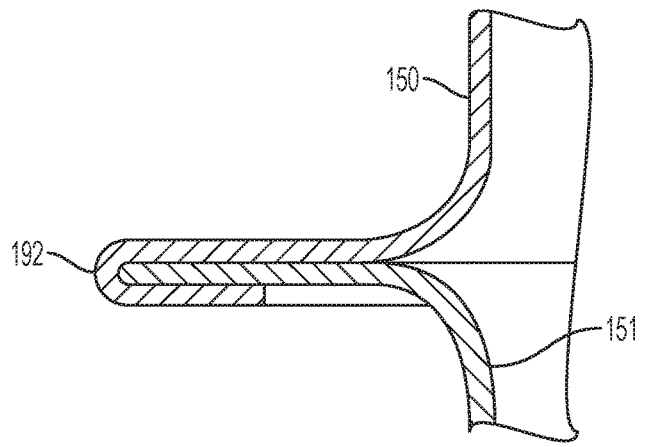
FIG. 10 is a partial section view of an edge of the collection housing of the water heater as in FIG. 1.

Referring to FIGS. 5A, 5B, and 6, collection housing 122 comprises a top housing portion 150 and a bottom housing portion 151, wherein outermost edges 192 of top housing portion 150 are rolled over outermost edges of bottom housing portion 151, as shown in FIG. 10, to provide a sealed interior, excepting an inlet portion 152 and an upper aperture 154. The edges of both top housing portion 150 and bottom housing portion 151 comprise generally planar horizontal wings that, when top housing portion 150 and bottom housing portion 151 mate, comprise wings 158 that extend generally transverse to a vertical center axis of the circular periphery of collection housing 122. Wings 158 provide attachment surfaces for struts 162 that mount collection housing 122 to interior duct portion 130, or in other embodiments, bottom wall 105 or other surfaces within the combustion chamber. Further, at wings 158, top housing portion 150 and bottom housing portion 151 comprise mating holes 156 and 157, respectively, wherein edges from the top housing portion 150 are rolled through bottom housing portion 151, thereby further securing collection housing 122.

Inlet portion 152 surrounds and defines a mating channel 153 having an inner diameter matching the outer diameter of outlet 132 (FIGS. 1 and 2B), thereby providing a mating region between duct 121 and collection housing 122, wherein outlet 132 fits snugly into mating channel 153. Mating channel 153 has approximately annular cross sections with constant diameters (i.e., defining a cylindrical volume). Further, as shown in FIG. 5B, face 131 of interior duct portion 130 provides attachment holes 161 (FIG. 2B) to attach to struts 162 (FIG. 5B) that extend outward from face 131 and roll over wings 158 in order to support and hold collection housing 122 to duct 121. Attachment points 161 are holes configured to receive attachment hardware (e.g., screws, nuts, bolts, rivets, rivnuts, etc.), for attaching to struts 162.

Figure 13:
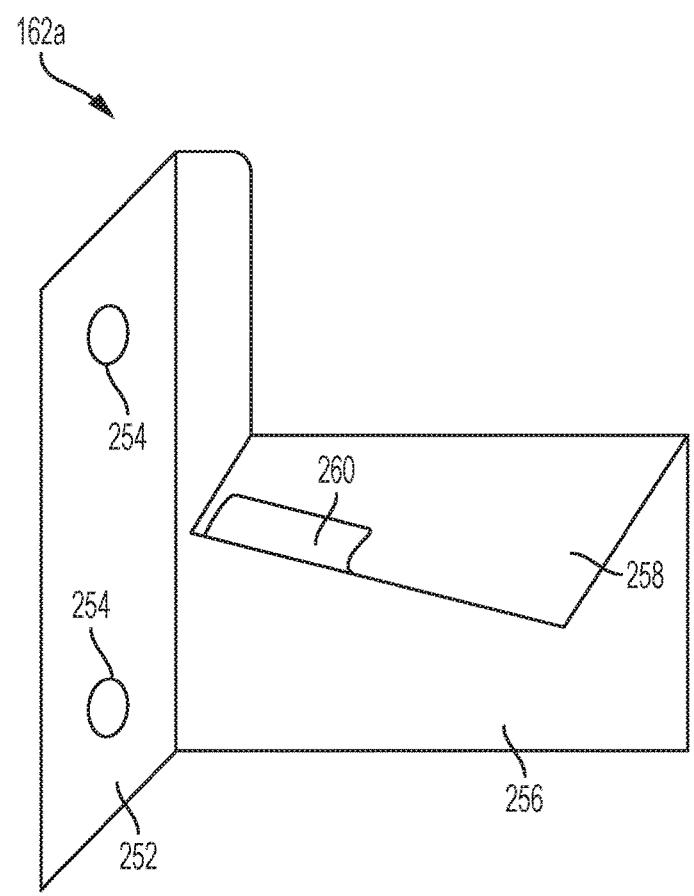
FIG. 13 is a strut for mounting the collection housing in the water heater as in FIG. 1.

Struts 162 include a first strut 162a and a second strut 162b. Referring also to FIG. 13, strut 162a has a vertical planar portion 252 that abuts face 131. Vertical portion 252 has through-holes 254 corresponding to attachment points 161 for attaching strut 162 to duct 121. A generally planar, vertically oriented portion 256 extends perpendicular to face 131. A horizontal planar portion 258 extends 90 degrees from a top edge of vertically oriented portion 256. A flap 260 folds back 180 degrees from a distal edge (with respect to portion 256) of horizontal planar portion 258 at a corner nearest vertical portion 252 to provide an attachment for a wing 158. A bottom surface of flap 260 is spaced from a top surface of horizontal planar portion 258 by a distance that is less than the thickness of wings 158 (in the vertical direction as shown in the Figures). In this way, when wings 158 are inserted between flaps 260 and portion 258, they are held in place via compression. The distal edges of horizontal portion 258 and flap 260 are oriented at an angle with respect to an axis through outlet 132 that is equal to the angle of an edge of a wing 158 (with respect to the axis through channel 152) to be inserted between, and held by, flap 260 and portion 258. That is, when collection housing 120 is in place, the edge of the wing 158 and the edge of the distal edge of flap 260 are aligned. In this way, during assembly, collection housing 120 may be properly oriented (wings 158 parallel with the horizontal and mating channel 153 axially aligned with outlet 132) and then slid into place for easy manufacturing. Strut 162b is the mirror image of strut 162a, mirrored over the plane of portion 256.

Figure 9:
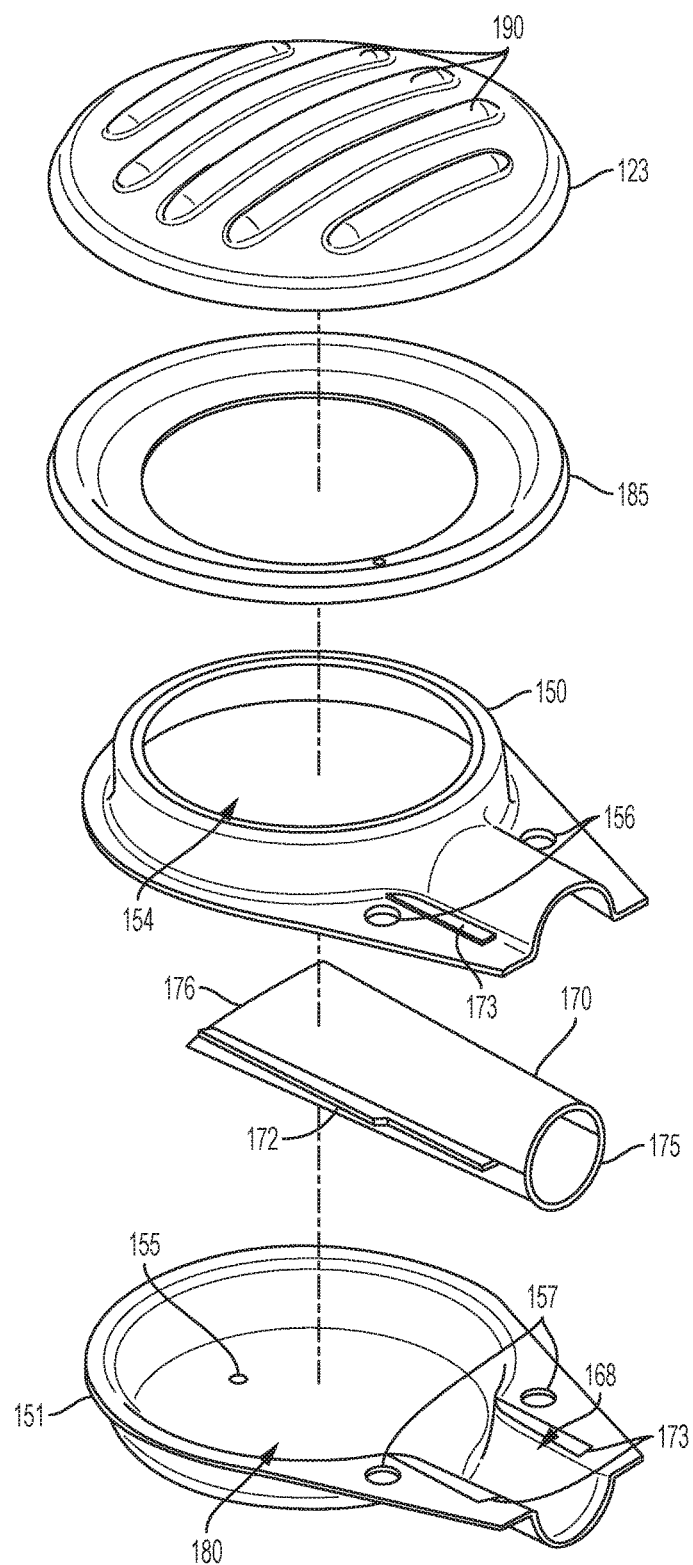
FIG. 9 is an exploded view of the burner of the water heater as in FIG. 1.

As shown in FIG. 6, adjacent to mating channel 153 is a venturi mating channel 168 that matches an exterior surface of a venturi tube 170 (FIG. 9) in order to orient and hold venturi tube 170 in place. Venturi mating channel 168 has approximately annular cross sections with increasing diameters approaching the center of collection housing 122. When outlet 132 is received by mating channel 153, it abuts a leading edge of venturi tube 170. Thus, mating channel 153 does not form part of the airflow channel, which is instead defined by duct 121 and venturi tube 170. Referring also to FIG. 9, venturi tube 170 further comprises flanges 172 on each side of the tube, which fit into grooves 173 stamped into the wings of top housing portion 150 and bottom housing portion 151 to further provide orientation and stability for venturi tube 170. A post 155 in bottom housing portion 151 is received by an orienting hole 171 of venturi tube 170 to thereby assure proper orientation of tube 170 in the burner assembly. Further, venturi tube 170 is spot-welded to bottom housing portion 151.

Because outlet 132 is inserted into mating channel 153 without requiring further fastening mechanisms, the above-described arrangement for attaching duct 121 to collection housing 122 via venturi tube 170 facilitates manufacture.

Figure 12:
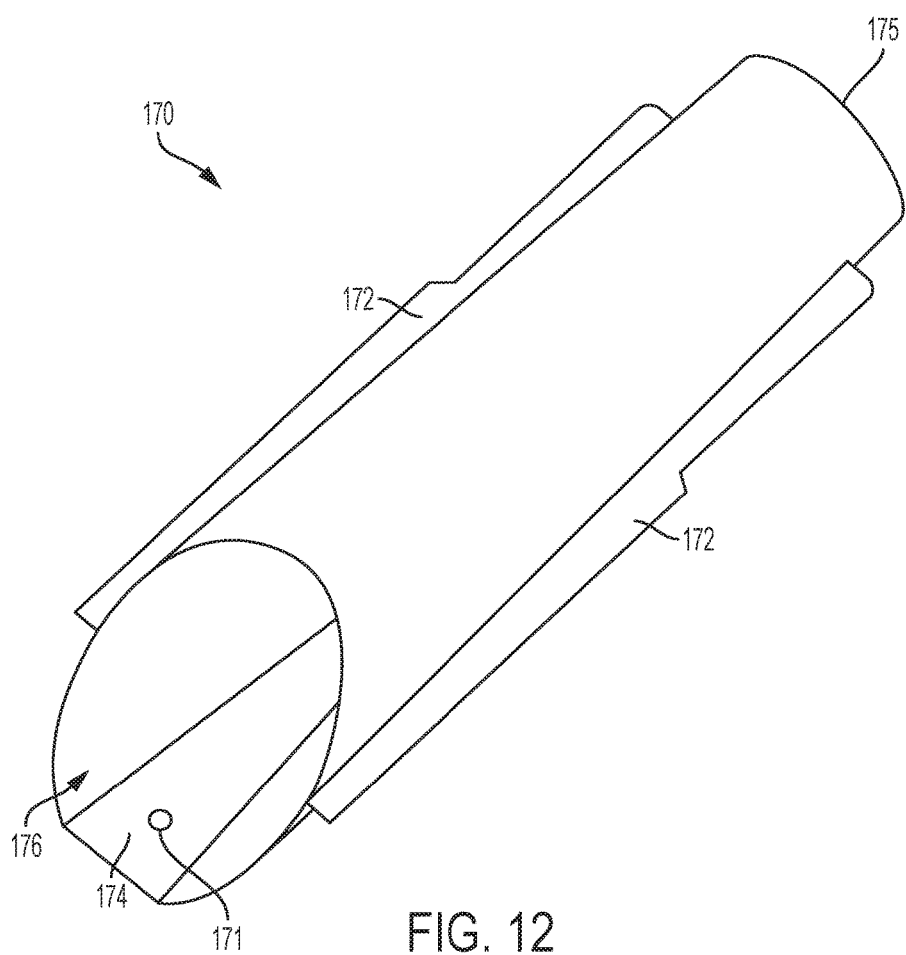
FIG. 12 is a perspective view of a venturi tube of the burner of the water heater as in FIG. 1.

Referring to FIG. 12, venturi tube 170 has an entry face 175, the edge of which is defined by a plane perpendicular to a longitudinal axis of the elongated tube 170 and parallel to a plane defined by the face of outlet 132 (FIGS. 1 and 2B), and an exit face 176 defined by a plane disposed at an acute angle with respect to the longitudinal axis. As shown in FIG. 9, venturi tube 170 may be oriented so that exit face 176 opens upward into the chamber defined by collection housing portions 150 and 151, thus allowing a more centralized upward flow of the air/fuel mixture (described below) into the volume of collection housing 122 (see FIG. 6). Referring back to FIG. 12, venturi tube 170 has a generally frustoconical interior volume, with an increasing cross-section diameter in the direction from entry face 175 to exit face 176. Slightly deviating from its generally frustoconical interior volume, venturi tube 170 has a flat edge 174 on its longest side, the flat edge being used for mounting/spot welding the venturi tube to other components and for lowering the vertical profile to fit venturi tube 170 in collection housing 122. In the embodiment shown in the Figures, venturi tube 170 comprises a pair of formed sheet metal parts with flanged edges in a clamshell construction so that a top venturi tube flange portion rolls over a bottom venturi tube flange portion to create flanges 172, similar to that of top and bottom housing portions 150, 151, as shown in FIG. 10. The operation of burner assembly 120 utilizes the venturi effect defined by the internal geometry of tube 170 to draw air and gas into burner assembly 120 at a rate determined by in part by the geometry of the assembly. The relatively restricted opening at entry face 175 reduces fluid pressure at that end of the tube, thereby facilitating a draw that assists in drawing air from the duct into the air/fuel flow. The restricted opening at entry face 175 also facilitates the mixing of air and fuel as it enters burner 120.

Figure 11:
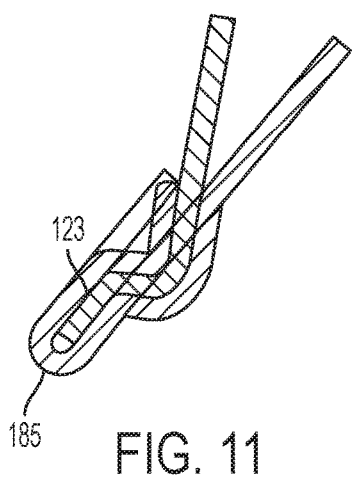
FIG. 11 is a partial section view of a connection between a baffle and a surface of the burner of the water heater as in FIG. 1.

Referring to FIGS. 6 and 9, venturi mating channel 168 terminates at a round basin 180 having a generally cylindrical body with filleted edges, bounded by top housing portion 150 and bottom housing portion 151 with a circular upper aperture 154. When the burner is in use, upper aperture 154 provides an outlet for the mixture of air and gas. Attached to top housing portion 150 at upper aperture 154 is a baffle 185, wherein an edge of baffle 185 is crimped between a rolled edge of housing portion 150, similar to that of top and bottom housing portions 150, 151, as shown in FIG. 10. Baffle 185 comprises a flat portion extending radially outward from upper aperture 154, bending into an upwardly-sloped portion that rolls outwards into a lip, which, in turn, folds back over the outermost edge of burner surface 123 and is further secured with a plurality of crimped beads around the circumference, a section view of which is shown in FIG. 11. Baffle 185 provides a guide for the air and gas mixture that collects in basin 180 to burner surface 123. Further, baffle 185 may connect to a burner surface 123 that extends beyond the periphery of the collection housing, in the horizontal direction as shown in the illustrated embodiment, thereby enabling a maximized burning surface while maintaining a geometry within collection housing 122 for proper mixing of air and gas. In further embodiments, baffle 185 may have different geometries and diameters. In this way, a single-sized collection housing 122 may be adapted, via selection of varyingly-sized baffles that are all configured on one end to fit housing 122 but varying in configurations on the burner side to accommodate differently sized burner surfaces, to connect to a variety of burner surfaces 123. For example, a larger water heater may benefit from a larger burner surface. Thus, a baffle with a larger burner attachment opening may enable collection housing 122 to be adapted to connect to a burner surface having a larger diameter.

Burner surface 123 comprises a mesh screen that forms a surface that is partially spherical. In alternate embodiments, other perforated materials may serve as a perforated combustion surface, such as, for example, a porous ceramic material. By matching the surface geometry of burner surface 123 to the surface geometry of lower tank wall 102 (FIG. 1), radiated heat may be more evenly distributed to the lower tank wall and, to water within tank 101 (FIG. 1). Further, burner surface 123 may comprise rounded ridges 190, running longitudinally across burner surface 123. Ridges 190 provide rigidity to the mesh structure and reduce vibrations therein, thereby reducing noise, particularly when burner surface 123 is heating up and cooling down. Edges of burner surface 123 fold down to mate with the rolled lip of baffle 185.

Figure 7:
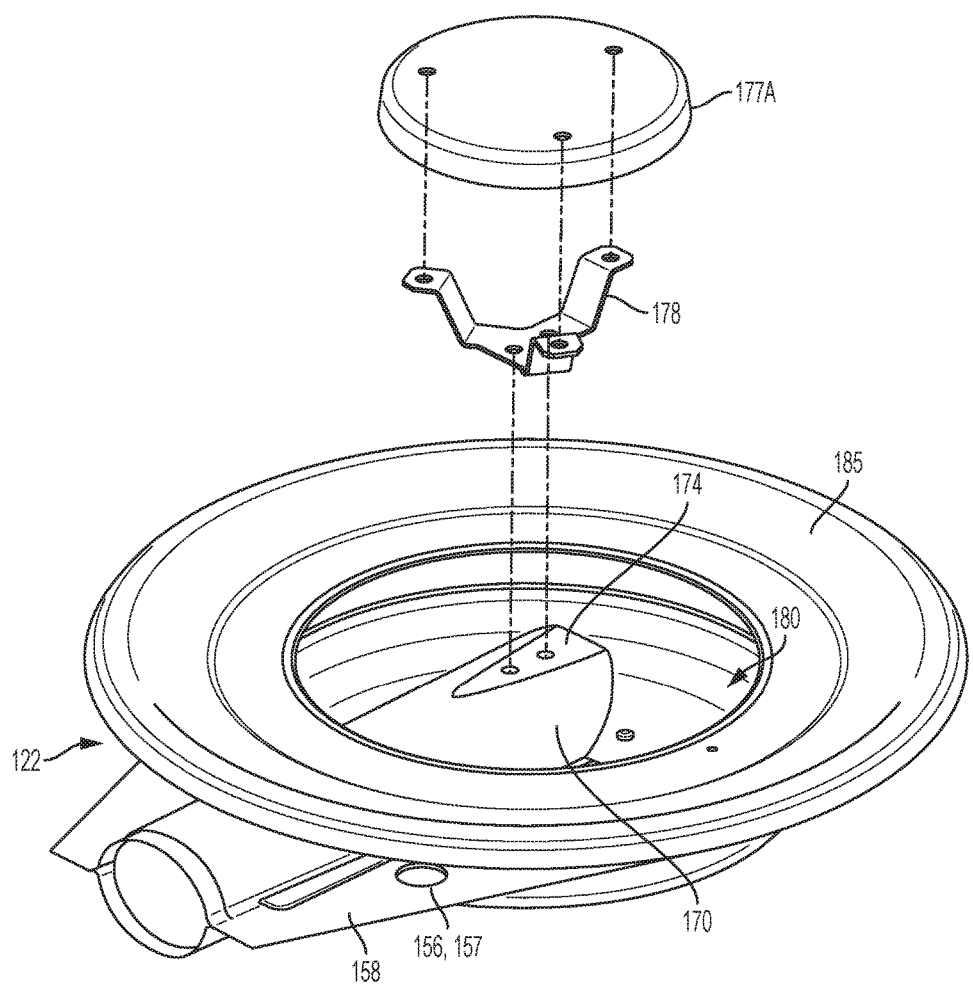
FIG. 7 is an exploded partial perspective view of a burner of the water heater as in FIG. 1 with a diffuser.

In another embodiment, as illustrated in FIGS. 1 and 7, the venturi tube is oriented so that the opening defined by exit face 176 opens downward and so that flat surface 174 is on the top side of the tube, as described below. That is, venturi tube 170 is rotated 180° about its longitudinal axis with respect to the orientation in the previously described embodiment, so that exit face 176 opens downwards. In an embodiment, burner 122 further comprises a diffuser 177A attached to an upper portion of venturi tube 170 at flat surface 174 via a diffuser mounting bracket 178.

Figure 8:
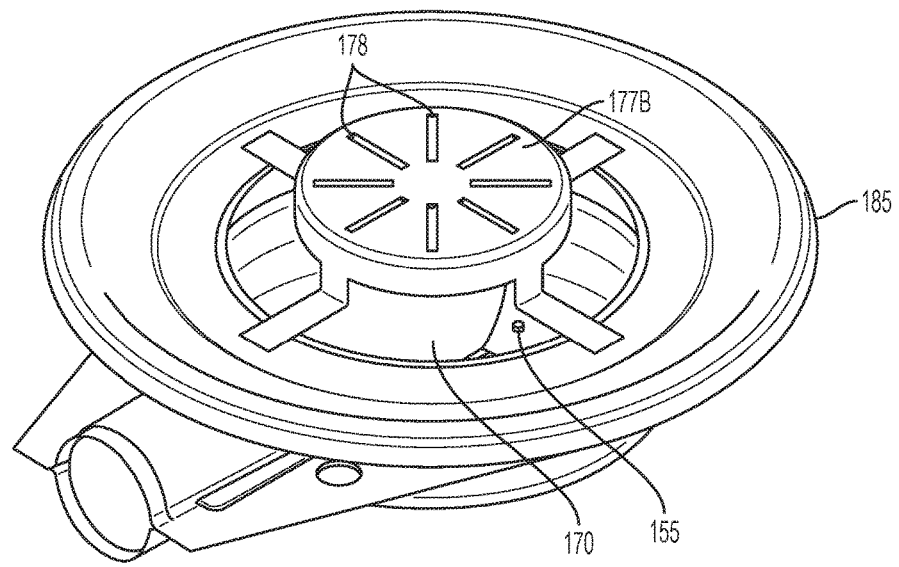
FIG. 8 is perspective partial perspective view of the burner of the water heater as in FIG. 1 with another diffuser.

With its downward facing opening at 176, the venturi tube forces the air/gas mixture to spread out more evenly into basin 180 around the sides of opening 176. Diffuser 177A further inhibits over-concentration of the air/fuel mixture flow toward the center of the volume in collection housing 122 and pushes the mixture out toward the edges of that volume, thus enabling a more even, and thus efficient, burn. Diffuser 177A has an inverted cup shape with a circular flat top surface and side walls with annular cross sections extending therebelow. In this configuration, venturi tube 170 comprises two mounting holes for receiving mounting hardware for attachment to bracket 178, which, in turn, attaches to diffuser 177A. In another embodiment, FIG. 8 illustrates an alternative diffuser 177B, with a similar inverted cup shape, further comprising diffuser slots 179. Alternate diffuser 177B comprises four flanges extending downward from the cup portion and splaying out at right angles to mount to baffle 185.

As illustrated in FIG. 5B, an igniter 200 is disposed within combustion chamber 106 near burner surface 123 and thereby provides an ignition source for the air/gas mixture passing upward through the mesh burner surface. Igniter 200 ignites a stream of gas from a pilot gas flow nozzle 204 that is disposed proximate the mesh burner surface. In turn, the ignited stream of gas from the pilot flow nozzle lights the air and gas mixture exiting from burner surface 123. When burner assembly 120 is in use, burner surface 123 acts as flammable vapor ignition resistance to prevent flames moving back within collection housing 122. The perforations in burner surface 123 serve as flame-quenching openings that permit fuel and air to upwardly traverse the screen but preclude the passage of flames downwardly therethrough. It should be understood that various geometries may be used for the diffuser to spatially diffuse the fuel/air mixture before it reaches the burner for more complete combustion.

Referring to FIG. 1, in operation of water heater 100, controller 201 disposed at the housing of water heater 100 receives temperature data from one or more thermistors 202 disposed, e.g., on water outlet pipe 116 so that the thermistor is in communication with the water in tank 101 and the thermistor's output signal corresponds to water temperature. When the water temperature falls below a predetermined low-temperature threshold, or set point, controller 201 sends a signal to a relay (not shown), which in turn controls a gas valve (not shown) in gas line 129 that controls flow of gas in the line. In this instance, controller 201 opens the gas valve to thereby allow the pressurized gas to flow via nozzle 133 (FIG. 4) into the inner volume of inner duct portion 130. The gas flow exiting the nozzle creates a flow that lowers pressure within inner duct portion 130, thereby drawing air into the gas flow from volume 90 of the portion of duct 125 exterior to the periphery of tank 101. After a predetermined time of maintaining the gas valve in an open state to thereby allow the air/gas flow mixture to flow into the inner volume of collection housing 122 and upward through opening 184 to burner surface 123, controller 201 sends a signal to a relay that controls the application of electric current to igniter 200 to cause the igniter to generate a spark just beyond the surface of burner surface 123. As the air/fuel mixture fills the burner interior volume and rises upward through burner surface 123, this ignites the air/fuel mixture. A flame sensor 203, disposed within the combustion chamber proximate the exterior of burner surface 123, detects the existence of the flame and sends a corresponding signal to controller 201.

Controller 201 continues to monitor signals from the temperature and flame sensors and maintains the gas valve in an open position (i.e., so that gas continues to flow into chamber 130) as long as the temperature sensor indicates that the ambient water temperature is below a second, high-temperature threshold (or set point) that is higher than the low-temperature set point that triggered opening of the gas valve and as long as controller 201 continues to receive a signal from flame sensor 203 indicating that the flame exists. If either of these conditions becomes untrue (i.e. if the water temperature reaches the high-temperature set point or if the flame extinguishes), controller 201 sends a signal to the relay to close the gas control valve, thereby ceasing the flow of gas into housing 130. Once controller 201 ceases the gas flow, it again monitors the temperature signal from thermistor 202 and compares the water temperature to the low set point, opening the gas valve and igniting the burner when the water temperature again falls below the low set point. The cycle repeats to maintain the water temperature between the high- and low-temperature thresholds.

As described above, the initial opening of the gas valve by controller 201 causes an initial flow of gas into duct housing part 130, so that the resulting low pressure draws air from the exterior duct volume into inner duct housing 130 to mix with the gas flow and proceed into burner 122. Once the air/gas mixture ignites, heat caused by the combusting mixture causes the combustion products to have a lower density than does the air external to the tank. Therefore, the hot combustion products rise up through and out of flue 107, creating a low pressure in the combustion chamber. The combustion chamber is a generally sealed volume except for flue 107 and the flow path through the mesh burner surface, the interior of collection housing 122, venturi tube 170, the interior of inner duct housing 130, volume 90 of exterior duct housing 125, and air source volume 112, including the mating joint between outlet 132 and venturi tube 170. Thus, as hot combustion products are expelled from flue 107, the resulting relatively low pressure draws air from air source volume 112, through holes 124 and exterior duct volume 90 into inner duct 130 and the interior of burner housing 122. Here the air and combustible fuel mix and flow up to the burner surface in response to the low pressure, such that the flow approaches a steady state. From an understanding of the operation of the combustion chamber and the air flow into the burner body, along with an expected gas volume received from the nozzle, a generally predictable air/fuel mix ratio may be determined. Control of this ratio allows the minimization of excess air in the air/fuel mixture, and the generally-sealed nature of the combustion chamber as described above limits the amount of excess air available for combustion ambient to the burner assembly. Therefore, the arrangement show in the Figures, by reducing the availability of excess air, reduces the overall generation of $NO_x$. Notwithstanding the foregoing, the air/fuel mixture is not precisely controlled. Therefore, to facilitate complete combustion of fuel gas, a small perforated grate 210 is provided in bottom wall 105 at a through-hole to allow a limited upward airflow into combustion chamber in response to the draw formed through the flue. The grating is configured in conjunction with the venturi tube and duct assembly so that a smaller amount of air flow is allowed into combustion chamber 106 than would occur if the water heater structure permitted unrestricted air flow to the burner from an air source such as the ambient tank environment.

While one or more preferred embodiments of the invention are described above, it should be appreciated by those skilled in the art that various modifications and variations can be made in the present invention without departing from the scope and spirit thereof. For example, in a further embodiment, top housing portion and bottom housing portion may be welded together. Moreover, while screws, welding, and rivets are used as fastening mechanisms in the embodiment described herein, further embodiments may interchange such fastening mechanisms with other similar techniques. Further, while certain geometries are shown, various other geometries are consistent with embodiments of the present disclosure. Additionally, many exemplary materials are presented, yet various substitutions can be made. For instance, many sheet metal parts may be replaced with machined parts.

Furthermore, the disclosure refers to gas as the combustible fuel. Certain embodiments of the present disclosure are directed towards use of natural gas as the combustible fuel. In other embodiments, other combustible fuels may be used, including, but not limited to, propane and gasoline.

Accordingly, it should be understood that the elements of one embodiment may be combined with another embodiment to create a still further embodiment. It is intended that the present invention cover such modifications and variations as come within the scope and spirit of the present disclosure, the appended claims, and their equivalents.

What is claimed is:

1. A water heater comprising:
    a tank defining a first volume for holding water and having a lower tank wall beneath the first volume, wherein the lower tank wall defines a first surface opposite the first volume;
    at least one side wall extending below the lower tank wall about a periphery of the tank, thereby defining a second surface;
    a bottom wall adjoining the at least one side wall opposite the lower tank wall, thereby defining a third surface, so that the first surface, the second surface, and the third surface define a second volume;
    a duct in communication with an ambient air source external to the second volume so that a third volume at least partially bounded by the duct receives air from the ambient air source, wherein the duct is in fluid communication with a pressurized fuel gas source so that the third volume receives a flow of fuel gas from the pressurized fuel gas source and so that the ambient air and fuel gas flow out of the third volume at least partially bounded by the duct in an output flow, and wherein at least a portion of the volume at least partially bounded by the duct is disposed outward of the second volume and the periphery; and a burner assembly partially disposed within the second volume, wherein the burner assembly comprises
a collection housing defining an inlet that receives the output flow and that defines an enclosure in fluid communication with the inlet so that the enclosure receives the ambient air and the fuel gas from the output flow for mixture in the enclosure, wherein the collection housing bounds the ambient air and fuel gas within the enclosure except for flow thereof from the inlet and through an upper aperture in the collection housing,
a skirt wall extending below the bottom wall about the periphery of the tank, so that a fourth volume is defined at least partially by the bottom wall and the skirt wall, wherein the skirt wall defines a plurality of holes therethrough, and wherein the duct is attached to the skirt wall over at least one of the plurality of holes so that the duct is in fluid communication with the fourth volume to receive ambient air therefrom, and
a perforated burner surface disposed within the second volume above the upper aperture and opposing the lower tank wall.

2. The water heater of claim 1, further comprising a venturi tube disposed within the collection housing at the inlet so that the venturi tube receives the output flow.

3. The water heater of claim 1, further comprising a baffle attached to the collection housing at an edge of the upper aperture and attached to an edge of the perforated burner surface and configured to direct flow from the collection housing to the perforated burner surface.

4. The water heater of claim 1, wherein the third volume is at least partially bounded by the at least one side wall.

5. The water heater of claim 4, wherein the duct is attached to a removable portion of the at least one side wall.

6. The water heater of claim 1, wherein the perforated burner surface covers an area greater than an area defined by the upper aperture.

7. The water heater of claim 1, further comprising a diffuser mounted within the burner assembly.

8. A water heater, said water heater comprising:
a tank defining a first volume for holding water and having a lower tank wall beneath the first volume, wherein the lower tank wall defines a first surface opposite the first volume;
at least one side wall extending below the lower tank wall about a periphery of the tank, thereby defining a second surface;
a bottom wall adjoining the at least one side wall opposite the lower tank wall, thereby defining a third surface, so that the first surface, the second surface, and the third surface define a second volume;
a duct primarily exterior to the periphery of the tank comprising a protruding outlet which protrudes into the second volume in communication with an ambient air source external to the second volume so that a third volume at least partially bounded by the duct receives ambient air from the ambient air source, wherein the duct is in fluid communication with a pressurized fuel gas source so that the third volume receives a flow of fuel gas from the pressurized fuel gas source and so that the ambient air and fuel gas flow out of the third volume at least partially bounded by the duct in an output flow through the protruding outlet; and a burner assembly partially disposed within the second volume, wherein the burner assembly comprises:
a venturi tube,
a collection housing defining an inlet that receives the output flow and that defines an enclosure in fluid communication with the inlet so that the enclosure receives the ambient air and the fuel gas from the output flow for mixture in the enclosure, wherein the collection housing bounds the ambient air and fuel gas within the enclosure except for flow thereof from the inlet and through an upper aperture in the collection housing, wherein the venturi tube is disposed within the enclosure, and the protruding outlet is received within the enclosure so that the protruding outlet abuts the venturi tube and is in fluid communication therewith so that the venturi tube receives the output flow therefrom,
a skirt wall extending below the bottom wall about the periphery of the tank, so that a fourth volume is defined at least partially by the bottom wall and the skirt wall, wherein the skirt wall defines a plurality of holes therethrough, and wherein the duct is attached to the skirt wall over at least one of the plurality of holes so that the duct is in fluid communication with the fourth volume via the hole to receive the ambient air therefrom, and
a perforated burner surface disposed within the second volume above the upper aperture and opposing the lower tank wall.

9. The water heater of claim 8, further comprising a baffle attached to the collection housing at an edge of the upper aperture and attached to an edge of the perforated burner surface and configured to direct flow from the collection housing to the perforated burner surface.

10. The water heater of claim 8, wherein the third volume is at least partially bounded by the at least one side wall.

11. The water heater of claim 10, wherein the duct is attached to a removable portion of the at least one side wall.

12. The water heater of claim 8, wherein the perforated burner surface covers an area greater than an area defined by the upper aperture.

13. The water heater of claim 8, further comprising a diffuser mounted within the burner assembly.

14. The water heater of claim 1, wherein the venturi tube comprises at least two flanges, and wherein the burner assembly comprises a first sheet metal section and a second sheet metal section, and at least one of the first sheet metal section and the second sheet metal section has at least two stamped indentations configured to align with the at least two flanges of the venturi tube and orient the venturi tube within the collection housing.

* * * * *